(12) United States Patent
Yaung et al.

(10) Patent No.: US 7,242,430 B2
(45) Date of Patent: Jul. 10, 2007

(54) HIGH DYNAMIC RANGE IMAGE SENSOR CELL

(75) Inventors: Dun-Nian Yaung, Taipei (TW); Ho-Ching Chien, Zhudong Town, Hsinchu County (TW); Tzu-Hsuan Hsu, Kaohsiung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 311 days.

(21) Appl. No.: 10/980,639

(22) Filed: Nov. 3, 2004

(65) Prior Publication Data
US 2006/0092301 A1 May 4, 2006

(51) Int. Cl.
*H04N 3/14* (2006.01)
*H04N 5/335* (2006.01)

(52) U.S. Cl. ...................... 348/308; 257/184
(58) Field of Classification Search ................ 257/184, 257/187, 290, 292; 348/294, 308
See application file for complete search history.

(56) References Cited

U.S. PATENT DOCUMENTS

| | | | | |
|---|---|---|---|---|
| 4,407,010 A | * | 9/1983 | Baji et al. ............... | 348/301 |
| 4,709,252 A | * | 11/1987 | Jhabvala et al. ......... | 257/293 |
| 6,255,638 B1 | * | 7/2001 | Eraluoto et al. ........ | 250/208.1 |
| 6,316,760 B1 | * | 11/2001 | Koyama .................. | 250/208.1 |
| 2003/0213915 A1 | * | 11/2003 | Chao et al. ............. | 250/370.14 |
| 2005/0083421 A1 | * | 4/2005 | Berezin et al. ......... | 348/308 |

OTHER PUBLICATIONS

Bo-Rong Lin., A High Dynamic Range of CMOS Image Sensor Design Based on Two-Frame Composition, SOC Conference, 2003, Proceedings, IEEE Int'l [Systems-on Chip], pp. 389-392, Taiwan, ROC.

* cited by examiner

*Primary Examiner*—Hoai Pham
*Assistant Examiner*—Mursalin B. Hafiz
(74) *Attorney, Agent, or Firm*—Duane Morris LLP

(57) ABSTRACT

An image sensor cell includes a first MOS transistor coupled to an operating voltage for providing an output voltage of the image sensor cell with the output voltage changing conformingly with a voltage on a gate of the first MOS transistor. A photodiode is coupled to a floating node which further controls the voltage of the gate of the first MOS transistor. A photoconductor is coupled between the operating voltage and the floating node. The photoconductor has its resistance varying in response to a magnitude change of an imposed illumination so that the floating node is provided with additional electrical charges conformingly through the photoconductor while the photodiode drains electrical charges, thereby decreasing a voltage reduction rate of the voltage on the gate of the first MOS transistor.

20 Claims, 5 Drawing Sheets

ND RANGE IMAGE SENSOR
HIGH DYNAMIC RANGE IMAGE SENSOR CELL

BACKGROUND

The present invention relates generally to integrated circuit (IC) designs, and more particularly to an improved image sensor cell with a high dynamic range.

CMOS image sensors have offered significant advantages of cost and size over traditional sensor structures. Placing a semiconductor integrated circuit (IC) chip as an image sensor in the image plane of a camera greatly simplifies both still and video image recording and provides for flexible design of portable cameras. The CMOS image sensor is widely accepted because: 1) it operates at low voltages; 2) has low power consumption; 3) offers random access to the image data; 4) is compatible with CMOS logic technology; and 5) allows realization of an integrated single-chip camera. Typically, light from an image impinging on each active pixel sensor is sensed and translated into data, which may include a plurality of transistors, a photodiode and a current generator. For example, a three-transistor active pixel sensor is typically composed of a reset transistor, a source follower transistor, and a row selector transistor, with a photodiode, and a current generator.

An image produced by a camera ideally should be as similar as possible to the same image seen directly by the human eye. The human eye is less sensitive to changes in illumination in bright environments than in dark environments. In fact, the human eye responds to a wide range of illumination without hardly being saturated, meaning that the human eye is no longer sensitive to a change of illumination intensity. However, this is not how the conventional active pixel sensor operates. The conventional active pixel sensor has a linear response over its initial light level of illumination, and then abruptly saturates when the light level reaches a certain point. This operational feature is often referred to as the machine mode. When the saturation occurs, a bright light level will flood the photodiode of the sensor and drive it to a full current conduction. The abrupt saturation limits the dynamic range of the sensor. It is desirable that the senor captures an image with a quality as close as possible to the human eye does. Since the human eye hardly saturates, the image captured by the sensor with the limited dynamic range would not be very close to that observed by a human eye.

Therefore, there is a need for an image sensor that more nearly emulates the light response of the human eye.

SUMMARY

An improved image sensor cell that will more nearly emulate the light response of the human eye is provided. In one embodiment, the image sensor cell includes a first MOS transistor coupled to an operating voltage for providing an output voltage of the image sensor cell with the output voltage changing conformingly with a voltage on a gate of the first MOS transistor. A photodiode is coupled to a floating node which further controls the voltage of the gate of the first MOS transistor. A photoconductor is coupled between the operating voltage and the floating node. The photoconductor has its resistance varying in response to a magnitude change of an imposed illumination so that the floating node is provided with additional electrical charges conformingly through the photoconductor while the photodiode drains electrical charges, thereby decreasing a voltage reduction rate of the voltage on the gate of the first MOS transistor.

The construction and method of operation of the invention, however, together with additional objects and advantages thereof will be best understood from the following description of specific embodiments when read in connection with the accompanying drawings.

DESCRIPTION

Figures 1, 2:
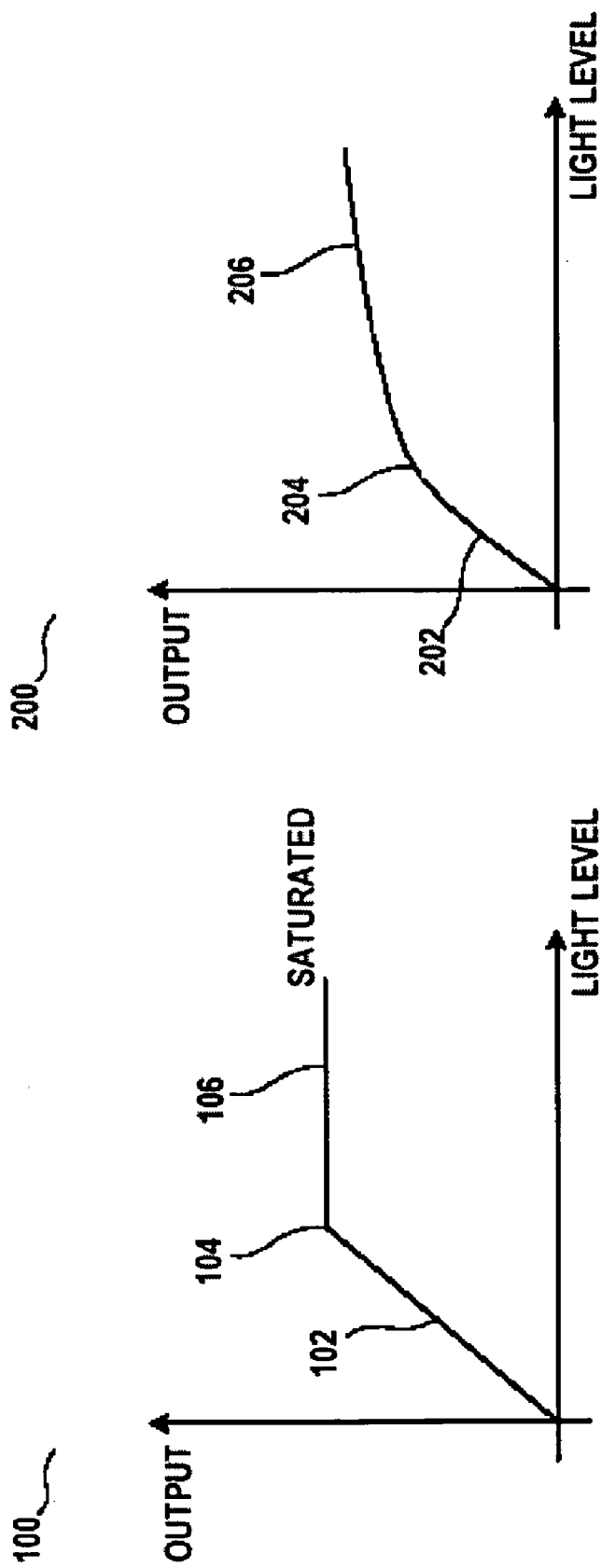
FIG. 1 shows the signal response of a conventional photosensor.
FIG. 2 shows the signal response of the human eye.

In FIG. 1, a graph 100 illustrates a typical machine mode response of an unspecified, conventional photosensor. In a low light level range 102, the initial response to an increase in illumination is linear. This is a desirable response for measuring instrumentation. As the light level increases further, the photosensor abruptly reaches its maximum response at a point 104. It saturates, and delivers a constant output, which is the maximum response to all higher light levels, in a section 106. However, in the current application, there is a need to have an image sensor cell that simulate the response of the human eye, which has a higher dynamic range and is less susceptible to the saturation problem.

In FIG. 2, a graph 200 illustrates a typical response of a human eye to different levels of light. From low light levels, the initial response to increasing light levels, in a section 202, is approximately linear. As the light level increases further, the human eye responds less and less efficiently. The response is no longer linear, as it weakens gradually from a point 204, and does not completely saturate in a section 206. This is the response that is to be emulated by the proposed image sensor cell of the invention, as it will be discussed in detail below.

Figure 3:
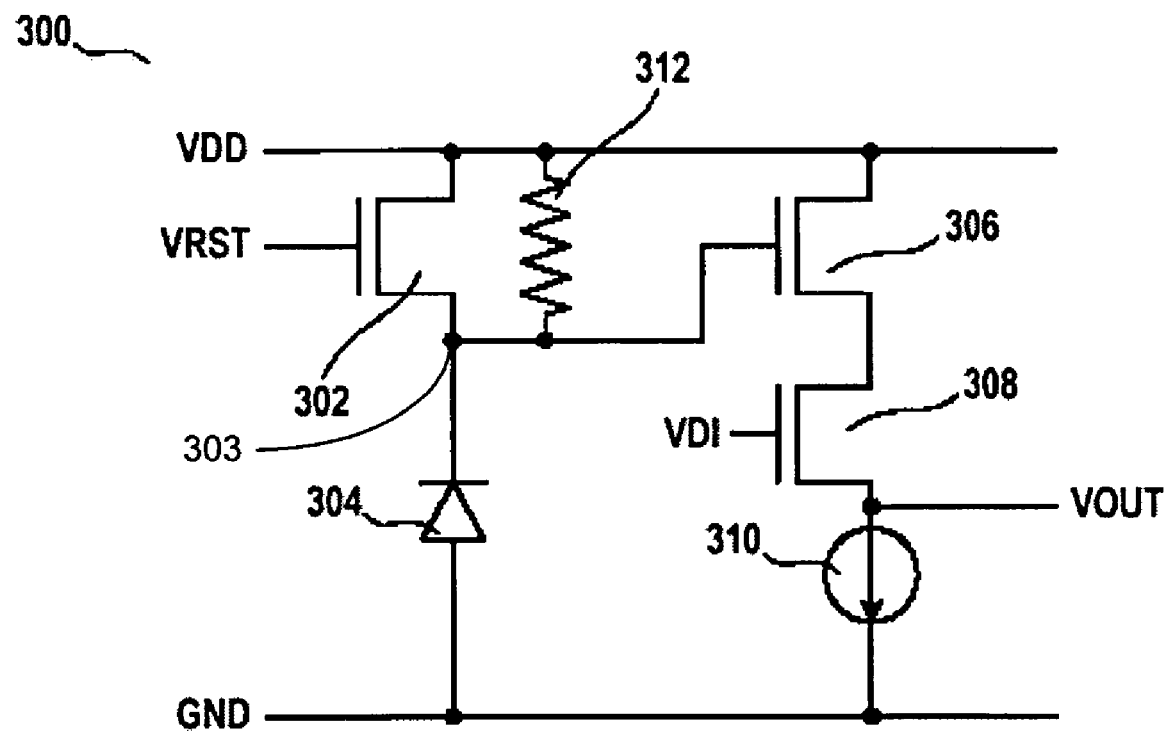
FIG. 3 shows a circuit diagram of a three-transistor image sensor cell, in accordance with one embodiment of the present invention.

FIG. 3 illustrates an image sensor cell 300, in accordance with one embodiment of the present invention. A reset metal-oxide-semiconductor (MOS) transistor 302 and a photodiode 304 are serially connected to a floating node 303, and between the operating voltage (VDD) and ground. A photoconductor 312 is coupled between VDD and the floating node 303, in parallel with the reset MOS transistor 302. A source follower MOS transistor 306 is coupled between VDD and a row selector MOS transistor 308, and having its gate coupled to the floating node 303. A current source 310 serially connects the row selector MOS transistor 308 to ground. The reset MOS transistor 302 receives a reset signal VRST at its gate and is switched by the same. The source follower MOS transistor 306 is switched by the voltage level at the floating node 303. The row selector MOS transistor 308 is switched by a signal VDI received at its gate. The output signal VOUT comes from between the row selector MOS transistor 308 and the current source 310. It is noteworthy that while, in this embodiment, the transistors 302, 306 and 308 are NMOS transistors, PMOS transistors can also be used to construct an image sensor cell as other embodiments of the invention.

When the image sensor cell 300 is in operation, a high signal VDI switches on the row selector MOS transistor 308, such that the source voltage of the source follower MOS transistor 306 determines the output signal VOUT. A high voltage reset signal VRST switches on the reset MOS transistor 302 to allow VDD charging the floating node 303. Then, a low voltage reset signal turns it off. The charged floating node 303 applies a high voltage to the gate of the source follower MOS transistor 306, and turns it on. The source voltage of the source follower MOS transistor 306 equals the voltage level at the floating node 303 minus the threshold voltage of the same. In other words, the source follower MOS transistor 306 provides an output voltage of the image sensor cell 300 with the output voltage changing conformingly with its gate voltage. The photodiode 304 is reverse biased between the floating node 303 and ground, so that no electric current would flow from the floating node 303 to ground when it sees no light, except for noise. When the photodiode 304 is exposed to light, it drains electrical charge from the floating node 303 to ground as a photocurrent. The brighter the light, the greater the photocurrent.

The photoconductor 312 is also a device sensitive and responsive to light, as the resistance of the photoconductor 312 decreases when the magnitude of illumination increases, or vice versa. In other words, the photoconductor 312 has its resistance varying in response to a magnitude change of illumination imposed thereon. The photoconductor can be a poly-silicon layer doped with boron or phosphorous, having a dopant density ranging between $10^{12}$ atom/cm$^3$ and $10^{18}$ atom/cm$^3$. Other semiconductor materials, such as germanium and silicon/germanium alloy, can also be used to construct such photoconductor.

The photoconductor 312 provides the floating node 303 with additional electrical charges while the photodiode 304 drains electrical charges, thereby decreasing a voltage reduction rate of the voltage on the gate of the source follower MOS transistor 306. When the image sensor cell 300 is exposed to a low range of light levels, the resistance of the photoconductor 312 is great enough so that it has negligible effect on the voltage level of the floating node 303. In this range, the photocurrent across the photodiode 304 increases in a substantially linear way, as the magnitude of illumination increases. This would cause the voltage level at the floating node 303 to decrease. Since the voltage level at the floating node 303 determines the source voltage of the source follower MOS transistor 306, the output signal VOUT varies conformingly in response to the magnitude change of illumination. When the magnitude of illumination reaches to a certain high level, the photodiode 304 saturates, and the photocurrent stop responding to a further increase of illumination. At this level, the photoconductor 312, as purposefully designed, will have a small resistance, whose impact can no longer be ignored. The operating voltage VDD will compensate the floating node 302, through the photoconductor 312, for its loss of electrical charge due to the photocurrent. This allows the image sensor cell 300 to keep responding to light in a less sensitive way, but not in a complete saturation.

Figure 4:
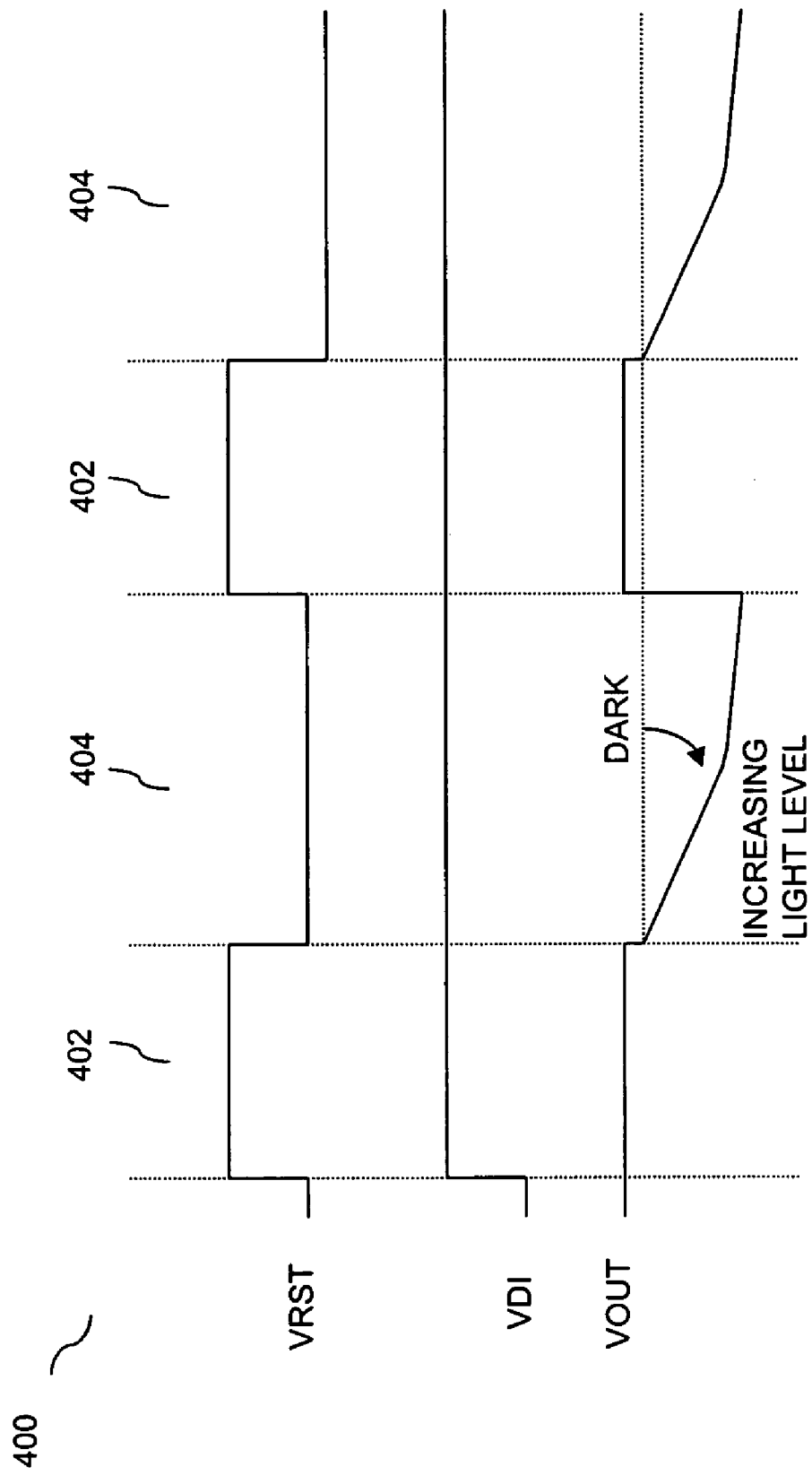
FIG. 4 is a timing diagram of the three-transistor image sensor cell, in accordance with one embodiment of the present invention.

Referring to FIG. 4 in view of FIG. 3, a timing chart 400 illustrates the variation of the signal levels of the image sensor cell 300. When the signal VDI is high, it initiates and continues the operation of the image sensor cell 300 with the added photoconductor 312. Common timing phases 402 and 404 are shown for all signals. The reset signal VRST cycles from high, in the phase 402, to low, in the phase 404, and back. When the reset signal VRST is high, in the phase 402, the output signal VOUT is reset and the circuit is prepared for another sense cycle, in the phase 404. When the reset signal VRST is low, in the phase 404, the output signal VOUT is a time integral of the response of the photodiode 304 to the light imposing on the cell during the sense cycle. At the end of the sense cycle, in the phase 404, the reset signal VRST resets, in the phase 402, and another sense cycle begins. It can be seen that the output signal VOUT initially responds to an increase of light in a substantially linear way, and then becomes less sensitive, yet not totally saturated.

Figure 5:
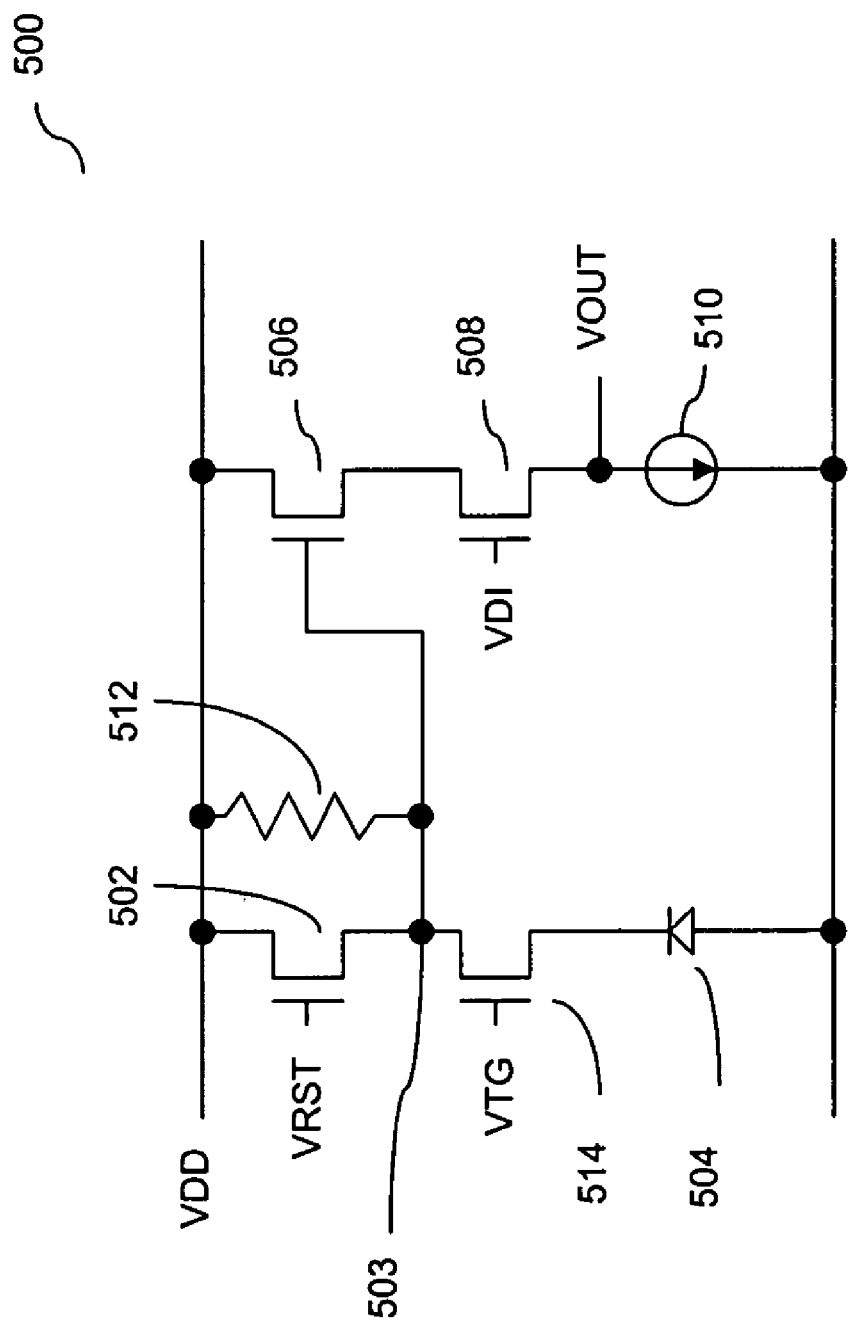
FIG. 5 shows a circuit diagram of a four-transistor image sensor cell, in accordance with another embodiment of the present invention.

FIG. 5 illustrates an image sensor cell 500, in accordance with another embodiment of the present invention. A reset MOS transistor 502, a transfer gate MOS transistor 514, and a photodiode 504 are serially connected between the operating voltage (VDD) and ground. The transfer gate MOS transistor 514 controls the current path between a floating node 503 and the photodiode 504. A photoconductor 512 is coupled between VDD and the floating node 503, in parallel with the reset MOS transistor 502. The gate of a source follower MOS transistor 506 is coupled to the floating node 503. The source follower MOS transistor 506 is coupled between VDD and a row selector MOS transistor 508. A current source 510 serially connects the row selector MOS transistor 508 to ground. The reset MOS transistor 502 receives a reset signal VRST at its gate and is switched by the same. The source follower MOS transistor 506 is switched by the voltage at the floating node 503. The row selector MOS transistor 508 is switched by a signal VDI received at its gate. The output signal VOUT comes from between the row selector MOS transistor 508 and the current source 510. It is noteworthy that while, in this embodiment, the transistors 502, 506, 508 and 514 are NMOS transistors, PMOS transistors can be used to construct an image sensor cell as other embodiments of the invention.

To avoid saturation, the image sensor cell 500 places a photoconductor 512 in parallel with the reset MOS transistor 502. The effect is to make the photodiode 504 and the photoconductor 512 partner in a voltage divider. Both the photodiode 504 and the photoconductor 512 see the light of the same pixel. At low light levels, the photoconductor 512 has a high resistance and therefore changes the response of the cell very little. At bright light levels, the photoconductor 512 has a lower resistance and therefore prevents the voltage level at the floating node 503 from being driven too far from VDD to ground. This prevents the source follower MOS transistor 506 from being totally shut down and driving the output signal level too low into saturation. This response more closely emulates the light response of the human eye.

Figure 6:
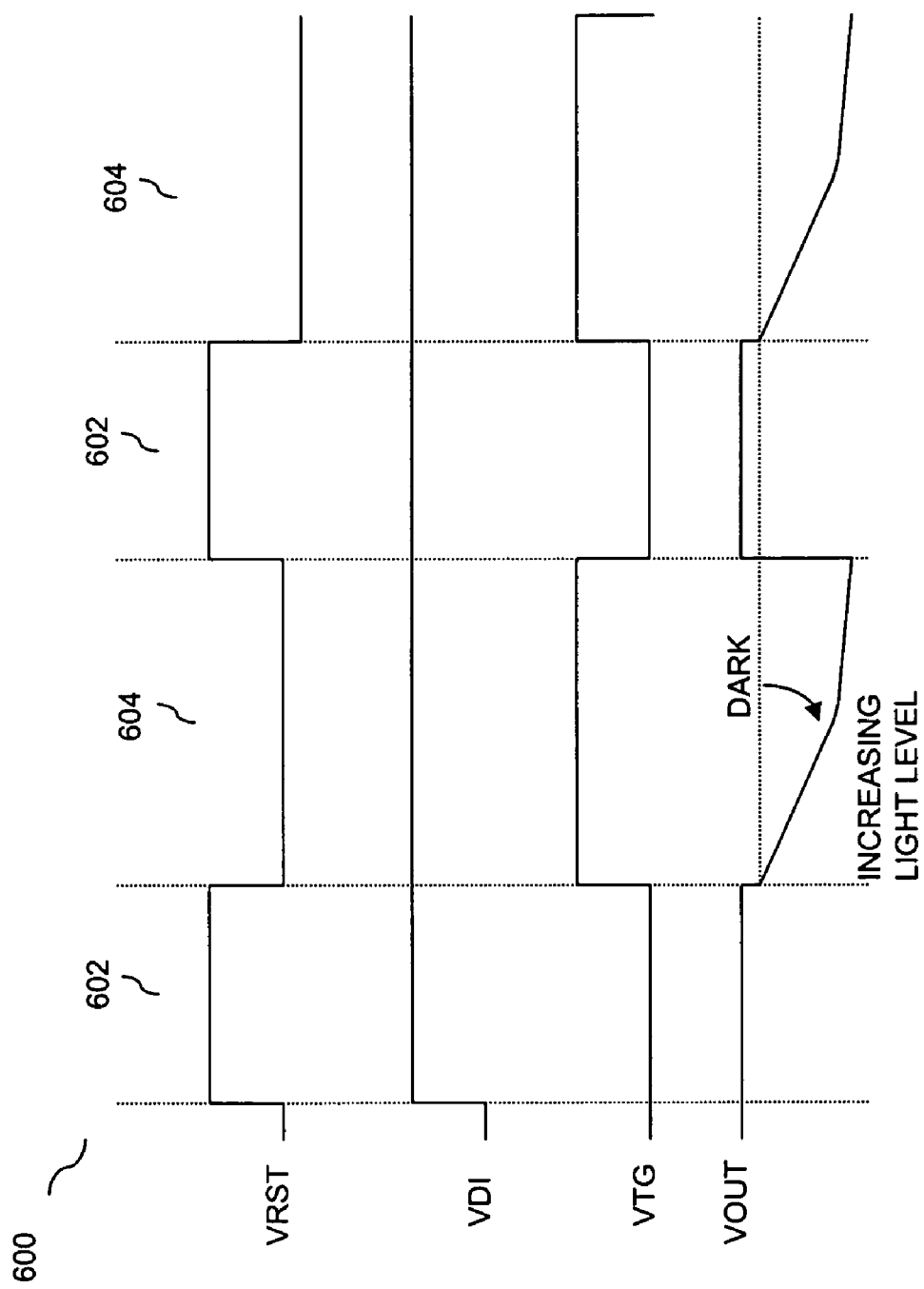
FIG. 6 is a timing diagram of the four-transistor image sensor cell, in accordance with another embodiment of the present invention.

Referring to FIG. 6 in view of FIG. 5, a timing chart 600 illustrates the variation of the signal levels of the image sensor cell 500. When the signal VDI is high, it initiates and continues the operation of the image sensor cell 500 with the added photoconductor. Common timing phases 602 and 604 are shown for all signals. The reset signal VRST cycles from high, in the phase 602, to low, in the phase 604, and back. The transfer gate signal VTG cycles from low, in the phase 602, to high, in the phase 604, and back. When the reset signal VRST is high, in the phase 602, the output signal VOUT is reset and the circuit is prepared for another sense cycle, in the phase 604. When the reset signal VRST is low and the transfer gate signal VTG is high, in the phase 604, the output signal VOUT is a time integral of the response of the photodiode 504 to the light imposed on the pixel during the sense cycle. At the end of the sense cycle, in the phase 604, the reset signal VRST resets, in the phase 602, and another sense cycle begins.

The disclosed image sensor cell emulates the human eye response to light, so that is provides an image more close to what the human eye sees. Since the cell keeps responding to light beyond a light level where conventional sensors saturate. Simply by utilizing a photoconductor, the disclosed cell is easy to design, and, therefore, has commercial potential.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An image sensor cell comprising:
   a first MOS transistor coupled to an operating voltage for providing an output voltage of the image sensor cell with the output voltage changing conformingly with a voltage on a gate of the first MOS transistor;
   a photodiode coupled to a floating node which further controls the voltage of the gate of the first MOS transistor; and
   a photoconductor coupled between the operating voltage and the floating node,
   wherein the photoconductor has its resistance varying in response to a magnitude change of an imposed illumination so that the floating node is provided with additional electrical charges conformingly through the photoconductor while the photodiode drains electrical charges, thereby decreasing a voltage reduction rate of the voltage on the gate of the first MOS transistor.

2. The image sensor cell of claim 1 wherein the resistance of the photoconductor decreases when the magnitude of the illumination increases, and vice versa.

3. The image sensor cell of claim 1 wherein the photoconductor is a doped poly-silicon or germanium layer.

4. The image sensor cell of claim 3 wherein the photoconductor has a dopant density ranging between $10^{12}$ atom/cm$^3$ and $10^{18}$ atom/cm$^3$.

5. The image sensor cell of claim 1 wherein the photodiode is reversed biased between the floating node and ground.

6. The image sensor cell of claim 1 further comprising a second MOS transistor coupled between the operating voltage and the floating gate for resetting the floating node, in response to a reset signal received at a gate of the second MOS transistor.

7. The image sensor cell of claim 1 further comprising a third MOS transistor serially coupled to the first MOS transistor for selecting the first MOS transistor to provide the output voltage of the image sensor cell.

8. The image sensor cell of claim 7 further comprising a current source serially coupled between the third MOS transistor and ground.

9. The image sensor cell of claim 1 further comprising a fourth MOS transistor coupled between the floating node and the photodiode for directing the drained charge through the photodiode.

10. An image sensor cell comprising:
    a first MOS transistor coupled to an operating voltage for providing an output voltage of the image sensor cell with the output voltage changing conformingly with a voltage on a gate of the first MOS transistor;
    a second MOS transistor coupled between the operating voltage and a floating node, which controls the voltage of the gate of the first MOS transistor, for resetting the floating node;
    a third MOS transistor serially coupled between the first MOS transistor and an output node for directing the output voltage of the image sensor cell to the output node;
    a photodiode coupled to the floating node, in series with the second MOS transistor; and
    a photoconductor coupled between the operating voltage and the floating node,
    wherein the photoconductor has its resistance varying in response to a magnitude change of an imposed illumination so that the floating node is provided with additional electrical charges conformingly through the photoconductor while the photodiode drains electrical charges, thereby decreasing a voltage reduction rate of the voltage on the gate of the first MOS transistor.

11. The image sensor cell of claim 10 wherein the resistance of the photoconductor decreases when the magnitude of the illumination increases, and vice versa.

12. The image sensor cell of claim 10 wherein the photoconductor is a doped poly-silicon or germanium layer.

13. The image sensor cell of claim 12 wherein the photoconductor has a dopant density ranging between $10^{12}$ atom/cm$^3$ and $10^{18}$ atom/cm$^3$.

14. The image sensor cell of claim 10 wherein the photodiode is reversed biased between floating node and ground.

15. The image sensor cell of claim 10 further comprising a current source serially coupled between the third MOS transistor and ground.

16. An image sensor cell comprising:
    a first MOS transistor coupled to an operating voltage for providing an output voltage of the image sensor cell with the output voltage changing conformingly with a voltage on a gate of the first MOS transistor;
    a second MOS transistor coupled between the operating voltage and a floating node, which controls the voltage of the gate of the first MOS transistor, for resetting the floating node;
    a third MOS transistor serially coupled between the first MOS transistor and an output node for directing the output voltage of the image sensor cell to the output node;
    a photodiode coupled to the floating node, in series with the second MOS transistor; and
    a photoconductor, which is made of doped poly-silicon or germanium, coupled between the operating voltage and the floating node,
    wherein the photoconductor has its resistance varying in response to a magnitude change of an imposed illumination so that the floating node is provided with additional electrical charges conformingly through the photoconductor while the photodiode drains electrical charges, thereby decreasing a voltage reduction rate of the voltage on the gate of the first MOS transistor.

17. The image sensor cell of claim 16 wherein the resistance of the photoconductor decreases when the magnitude of the illumination increases, and vice versa.

18. The image sensor cell of claim 16 wherein the photoconductor has a dopant density ranging between $10^{12}$ atom/cm$^3$ and $10^{18}$ atom/cm$^3$.

19. The image sensor cell of claim 16 wherein the photodiode is reversed biased between floating node and ground.

20. The image sensor cell of claim 16 further comprising a current source serially coupled between the third MOS transistor and ground.

* * * * *